(12) United States Patent
Jaaskelainen et al.

(10) Patent No.: US 12,332,098 B2
(45) Date of Patent: Jun. 17, 2025

(54) ACOUSTIC DEVICES FOR MEASURING MULTI-PHASE WELLBORE FLUID

(71) Applicant: Halliburton Energy Services, Inc., Houston, TX (US)

(72) Inventors: Mikko K. Jaaskelainen, Katy, TX (US); Faraaz Adil, Odessa, TX (US); Julian Drew, Centennial, CO (US); Barry Fish, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 517 days.

(21) Appl. No.: 17/832,363

(22) Filed: Jun. 3, 2022

(65) Prior Publication Data

US 2023/0392964 A1    Dec. 7, 2023

(51) Int. Cl.
*G01F 1/66*    (2022.01)
*G01F 1/661*   (2022.01)
*G01F 1/74*    (2006.01)

(52) U.S. Cl.
CPC .............. *G01F 1/666* (2013.01); *G01F 1/661* (2013.01); *G01F 1/74* (2013.01)

(58) Field of Classification Search
CPC . G01F 1/666; G01F 1/661; G01F 1/74; G01F 25/10
See application file for complete search history.

(56) References Cited

U.S. PATENT DOCUMENTS

| | | |
|---|---|---|
| 2007/0199696 A1 | 8/2007 | Walford |
| 2011/0036177 A1 | 2/2011 | Pinguet et al. |
| 2013/0042699 A1* | 2/2013 | Schultz ................ G01F 1/3227 73/861.19 |
| 2014/0297203 A1 | 10/2014 | Liao et al. |
| 2019/0120048 A1* | 4/2019 | Coffin ................ G01N 33/2823 |

(Continued)

FOREIGN PATENT DOCUMENTS

WO    2020206368 A1    10/2020

OTHER PUBLICATIONS

Halliburton Energy Services, Inc , "Oil and Gas Well Multi-Phase Fluid Flow Monitoring With Multiple Transducers and Machine Learning", Unpublished U.S. Appl. No. 63/263,89, filed Feb. 18, 2022. In accordance with the Waiver of the Copy Requirements in 37 CFR 1.98, for cited pending U.S. Patent applications, 1287 O.G. 163 (Oct. 19, 2004).

(Continued)

*Primary Examiner* — Catherine T. Rastovski
*Assistant Examiner* — Yossef Korang-Beheshti
(74) *Attorney, Agent, or Firm* — Kilpatrick Townsend & Stockton, LLP

(57) ABSTRACT

A system can determine multi-phase measurements with respect to a wellbore. The system can include a set of acoustic devices, a measurement device, and a computing device. The set of acoustic devices can be positioned at the surface of a wellbore to generate acoustic signals proportional to flow of fluid with respect to the wellbore. The measurement device can be positioned with respect to the set of acoustic devices to sense the acoustic signals. The computing device can be communicatively coupled to the measurement device to interpret the acoustic signals for determining a type of the fluid and a ratio of one or more phases of the fluid.

18 Claims, 9 Drawing Sheets

(56) References Cited

U.S. PATENT DOCUMENTS

2022/0178590 A1\* 6/2022 Toussaint ................ F24T 50/00
2022/0205354 A1\* 6/2022 Chaki .................... E21B 43/00

OTHER PUBLICATIONS

Halliburton Energy Services, Inc., International Search Report and Written Opinion, PCT/US2002/032241, Feb. 24, 2023, 11 pages.
Halliburton Energy Service, Inc., unpublished U.S. Appl. No. 63/263,898, filed Feb. 18, 2022, entitled Oil And Gas Well Multi-Phase Fluid Flow Monitoring With Multiple Transducers And Machine Learning. In accordance with the Waiver of the Copy Requirements in 37 CFR 1.98, for cited pending U.S. Patent applications, 1287 O.G. 163 (Oct. 19, 2004).

\* cited by examiner

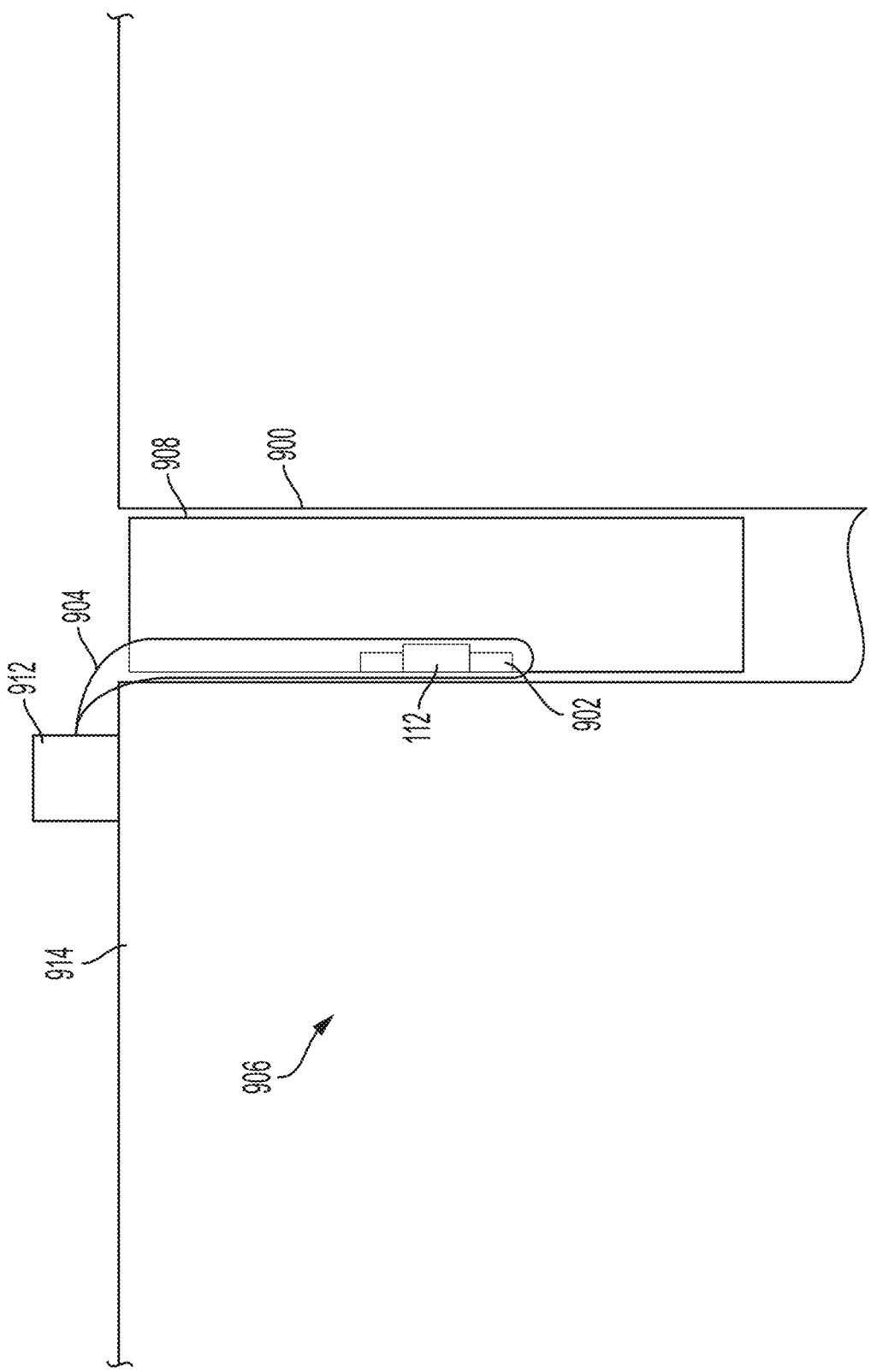

ACOUSTIC DEVICES FOR MEASURING MULTI-PHASE WELLBORE FLUID

TECHNICAL FIELD

The present disclosure relates generally to wellbore operations and, more particularly (although not necessarily exclusively), to acoustic devices for measuring multi-phase fluid from a wellbore.

BACKGROUND

A wellbore can be formed in a subterranean formation or a sub-oceanic formation for extracting produced hydrocarbon material. The wellbore can be used to produce fluid, which can include more than one phase. For example, the produced fluid can include oil, water, gas, and other suitable phases of produced fluid from the wellbore. Determining information relating to the produced fluid can be difficult. For example, signals from the fluid may not be detectable or otherwise understandable in the wellbore. Additionally, determining phase-specific information, such as flow rate, density, and the like is difficult, and other measurement systems may not accurately determine phase-specific information.

BRIEF DESCRIPTION OF THE DRAWINGS

FIG. 9 is a diagram of a wellbore that includes a downhole flow meter device and a measurement device according to one example of the present disclosure.

DETAILED DESCRIPTION

Figure 1:
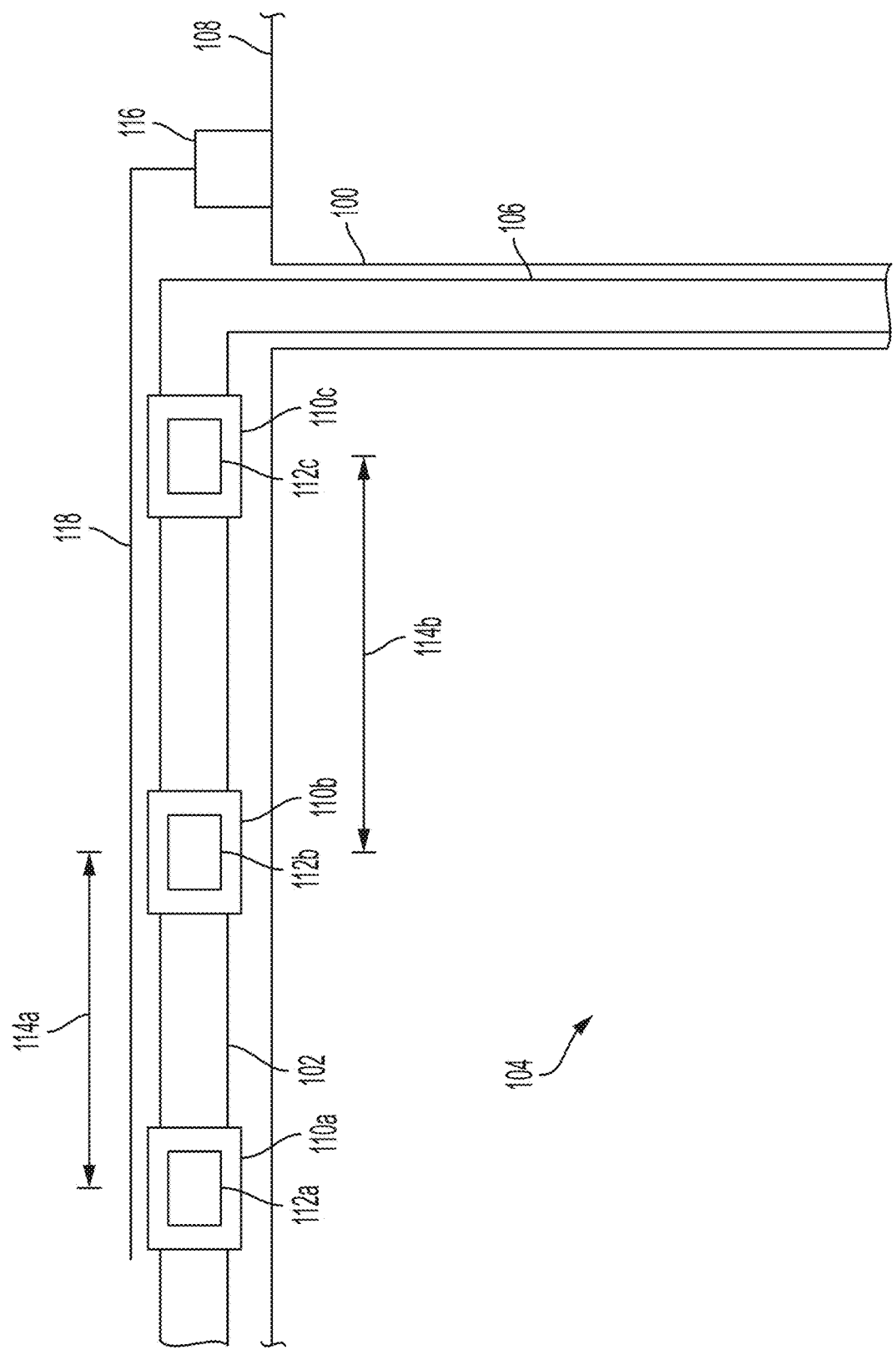
FIG. 1 is a diagram of a wellbore with a surface flow line according to one example of the present disclosure.

Certain aspects and examples of the present disclosure relate to acoustic devices for measuring multi-phase fluid with respect to a wellbore. The acoustic devices can be included in a surface flow meter, which can include a set of flow meter devices that can each include one or more acoustic devices. The acoustic devices can include one or more fluidic oscillators, one or more hole-tone whistles, or any other suitable acoustic devices. The multi-phase fluid can include oil, water, gas, other suitable phases, or a combination thereof. For example, the multi-phase fluid can be produced from the wellbore and can include a combination of water, oil, and gas. The acoustic devices may be arranged to measure one or more phases of the multi-phase fluid. For example, a first acoustic device can be positioned in a first location on a flow meter device for measuring the water phase of the multi-phase fluid, and a second acoustic device can be positioned in a second location on a flow meter device for measuring the oil phase of the multi-phase fluid, etc. The flow meter devices can be positioned a distance apart for measuring different phases of the multi-phase fluid in different locations. For example, a first flow meter device with a first acoustic device can be positioned in a first location along the surface flow line to measure a first phase of the multi-phase fluid, and a second flow meter device with a second acoustic device can be positioned in a second location along the surface flow line to measure a second phase of the multi-phase fluid.

A multi-well pad can be positioned at a surface of a subterranean formation or a sub-oceanic formation. The multi-well pad may include one or more wells (e.g., each having a wellbore formed in the formation). Surface flow meter measurements may not be performed on each well of the multi-well pad. For example, flow sensing can use excessive resources, can be disruptive to production, or a combination thereof. Thus, production monitoring may be performed on a pad-level across multiple wells or intermittently on individual wells. Monitoring production at pad-level or intermittently may not yield accurate or otherwise reliable results for fluid measurements. Additionally, the production monitoring may not be able to measure the multiple phases of fluid produced from each well or wellbore.

Low-cost and high-efficiency sensing can be applied to each well of the multi-well pad. A flow meter device that includes a set of acoustic devices can be used. The acoustic devices can include fluidic oscillators (e.g., symmetric or asymmetric), hole-tone whistles, other suitable acoustic devices, or any suitable combination thereof. The flow meter devices may be incrementally manufactured, and signals generated by the flow meter devices may be interrogated electrically or optically with wired or wireless connection (e.g., via IOT devices or Edge devices). The generated data may be combined with downhole distributed acoustic sensing (DAS) data to generate flow allocation profiles for the respective well. The combined data may be corresponded to fracture treatment schedules and improved models (physics, data-driven, hybrid, etc.) associated with the respective well.

The flow meter device may be interrogated using electrical sensors (MEMS accelerometers, differential pressure sensors, etc.), optical technologies (DAS, FO pressure gauges, other interferometric strain sensors, etc.), and the like. In some examples, the flow meter device can be positioned at the surface (e.g., on a surface flow line, etc.), and surface measurements can be made using the flow meter device. The surface measurements may be coupled with measurements from subsurface flow meters, pressure gauges, distributed measurements, or other suitable subsurface devices. The surface measurements may be used to calibrate subsurface flow measurements to improve flow allocation. Subsurface temperature and pressure measures may be used for pressure/volume/temperature (PVT) correction of fluids.

The flow meter device on the surface flow line can be used for various applications. For example, the applications can include production monitoring, production control, and production optimization. Additionally, the flow meter device can be used for single well applications, multi-well applications, or a combination thereof. Other applications of the flow meter device included in the surface flow line can include modelling and simulation, monitoring of single well completion performance, monitoring of multi-well completion performance and interaction, well planning (e.g., single well completion design, multi-well completion design, etc.), and well spacing. Measurements from the flow meter device can be used with respect to machine-learning techniques. For example, measurements from the flow meter device can be used to train machine-learning models, to use machine-learning techniques for optimizing control systems, and the like.

In a downhole (lateral) deployment, a multi-phase flow meter may rely on vertical separation (e.g., stratification) of the produced fluid. A diameter of pipe, a length of the pipe, flow rate, and flow regime in a surface application can determine a likelihood of success of measuring the multi-phase fluid. Based on a degree of vertical separation, techniques that can capture and characterize the flow rates or fluid-dependent properties over a vertical profile can be used to determine multi-phase flow rate. The analysis of data can involve a data-driven model, a physics-based model, a machine-learning model, or a combination thereof. The models can include an experimental, data-derived machine-learning model, a computational fluid dynamic (CFD) model, and the like. Further, measuring information relating to the multi-phase fluid can involve partitioning of fluid flow, for example, rather than full measurement and determination of multi-phase flow. An accurate measurement of an aggregated average multi-phase flow for a set of wells can be determined by measured output from a main fluid separator. For example, the main fluid separator can perform surface metering using downhole acoustic devices in a surface deployment in which multiple flow meters can be deployed corresponding to different flow or measurement points for corresponding wells.

The surface flow meter can use one or more fluidic oscillators at a location along a substantially horizontal surface section of a flow line. The substantially horizontal section can involve gravity separation such that a gas phase may include a higher velocity or higher frequency passing through a top-most acoustic device. Accordingly, the gas phase may generate high signal levels where signals from lower fluid sensing elements are drowned out. In some examples, multiple fluidic oscillators or other suitable acoustic devices can be spaced out in distance along the circumference of the surface flow line in which each location measures one phase or one orientation of the produced fluid. For example, gas sensing can be performed at the top of the surface flow line, water sensing can be performed at the bottom of the surface flow line, combined oil and gas measurement and combined oil and water measurement can be performed at different locations along the circumference of the surface flow line, etc. Spacing between measurement points (e.g., between surface flow meters) may be approximately or larger than ten times the pipe diameter to cause the flow return to a non-disturbed flow condition for measurement.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a wellbore 100 with a surface flow line 102 according to one example of the present disclosure. The wellbore 100 can be formed in a subterranean formation 104. Additionally or alternatively, the wellbore 100 can be formed in a sub-oceanic formation. The wellbore 100 can be a first wellbore in a set of wellbores of a multi-well pad or other suitable structure or system. The wellbore 100 can include a casing 106 or other suitable component (e.g., a tubing string, etc.) that can transport produced fluid from the wellbore 100 to the surface flow line 102. The casing 106 can be coupled (e.g., mechanically) to the surface flow line 102 and can direct produced fluid from the wellbore 100 into the surface flow line 102.

The surface flow line 102 can be positioned at a surface 108 of the wellbore 100. The surface flow line 102 can include a set of surface flow meters 110a-c that can be used to make measurements relating to the produced fluid. As illustrated, the set of surface flow meters 110a-c includes three surface flow meters, but other suitable numbers (e.g., less than three, such as one or two, or more than three such as four, five, six, etc.) of surface flow meters 110 are possible. Each surface flow meter 110 of the set of surface flow meters 110a-c can be positioned a minimum distance apart from a proximate surface flow meter 110. For example, the surface flow meter 110a can be spaced apart from the surface flow meter 110b by a first distance 114a, and the surface flow meter 110b can be spaced apart from the surface flow meter 110c by a second distance 114b, which may be similar or different than the first distance 114a. The first distance 114a and the second distance 114b may be greater than or equal to the minimum distance, which may allow the produced fluid to settle or to otherwise return to a measurable state after being transported into the surface flow line 102, after being measured at one or more surface flow meters 110, and the like.

Each surface flow meter 110 can include one or more acoustic devices 112, which can be used to generate acoustic signals in the surface flow line 102. As illustrated in FIG. 1, there are three acoustic devices 112a-c, which correspond to the set of surface flow meters 110a-c, but each surface flow meter 110 can include other suitable numbers (e.g., two, three, four, five, etc.) of acoustic devices. Additionally, each surface flow meter 110 can include similar numbers of acoustic devices 112 or different numbers of acoustic devices 112. In some examples, the number of acoustic devices 112 included in respective flow meters 110 may correspond to a number of phases to be measured at the respective flow meters 110. For example, the flow meter 110a may include one acoustic device 112a for measuring a single phase (e.g., oil, water, or gas) of the fluid, and a different flow meter may include three acoustic devices for measuring three phases (e.g., oil, water, and gas) of the fluid, etc. Additionally, the acoustic devices 112 may be positioned in the flow meter devices 110 for measuring one or more particular phases of fluid. For example, a first acoustic device 112a can be positioned at the top of a flow meter device 110 for measuring the gas phase of the multi-phase fluid, a second acoustic device 112b can be positioned between the top and bottom (e.g., on the circumference at the 3 o'clock position) of the flow meter device 110 for measuring a combination phase of oil and gas, etc.

In some examples, a computing device 116 can be positioned at the surface 108 (or in other locations such as downhole, remote, etc.) of the wellbore 100. In some examples, the computing device 116 can be or otherwise include a DAS system. Additionally or alternatively to a DAS system, other techniques may be used or employed by the computing device 116. The techniques may involve various implementations of Rayleigh scattering, Raman scattering, or Brillouin scattering and may be interferometric in nature. The sensing techniques may involve homodyne, heterodyne, Michelson, Mach-Zender, Fabry-Perot, phase based, intensity based, coherence based, static (e.g., absolute), or dynamic (e.g., relative) sensing principles. Single-point sensing and multi-point sensing based on Fiber Bragg Gratings or other intrinsic or extrinsic sensing principles may be used.

The computing device 116 can be communicatively coupled to a measurement device 118. As illustrated, the measurement device 118 is a fiber-optic cable, but the measurement device 118 can additionally or alternatively include a pressure transducer, a geophone, a hydrophone, an accelerometer, differential pressure sensors, other suitable measurement devices, such as optical measurement devices, wired electrical sensors, wireless electrical sensors, etc., or a combination thereof. The computing device 116 can receive acoustic signals via the measurement device 118. For example, the acoustic devices 112a-c can generate and propagate acoustic signals based on fluid flowing in the surface flow line 102. For example, the frequency of the acoustic signals can correspond to flow properties of the fluid. The acoustic signals can be sensed by the measurement device 118, which can direct the acoustic signals, or any suitable representation thereof, to the computing device 116. For example, the measurement device 118 can convert the acoustic signals to electrical signals or optical signals and can transmit the converted signals to the computing device 116. The computing device 116 can interpret the converted signals. For example, the computing device can determine (e.g., via a trained machine-learning model or other suitable software) a type of fluid flowing in the surface flow line 102, ratios of phases included in the surface flow line 102, one or more flow rates, or any other suitable multi-phase measurements with respect to the surface flow line 102.

In some examples, the surface flow line 102 can be used for an injection operation. For example, the injection operation may involve injecting a single phase of fluid into the wellbore 100. The single phase of fluid can include carbon dioxide, water, or other suitable material. The surface flow line 102 can be used to make measurements about the single phase of fluid. For example, the surface flow line 102 can include one flow meter device 110, which may include one acoustic device 112. The single phase of fluid can pass through the one flow meter device 110, and the one acoustic device 112 can generate acoustic signals proportional to fluid flow of the single phase of fluid through the one flow meter device 110. The computing device 116 can be used to interpret the acoustic signals from the one acoustic device 112, and the computing device 116 can determine flow rates and other suitable measurements for the single phase of fluid.

Figure 2:
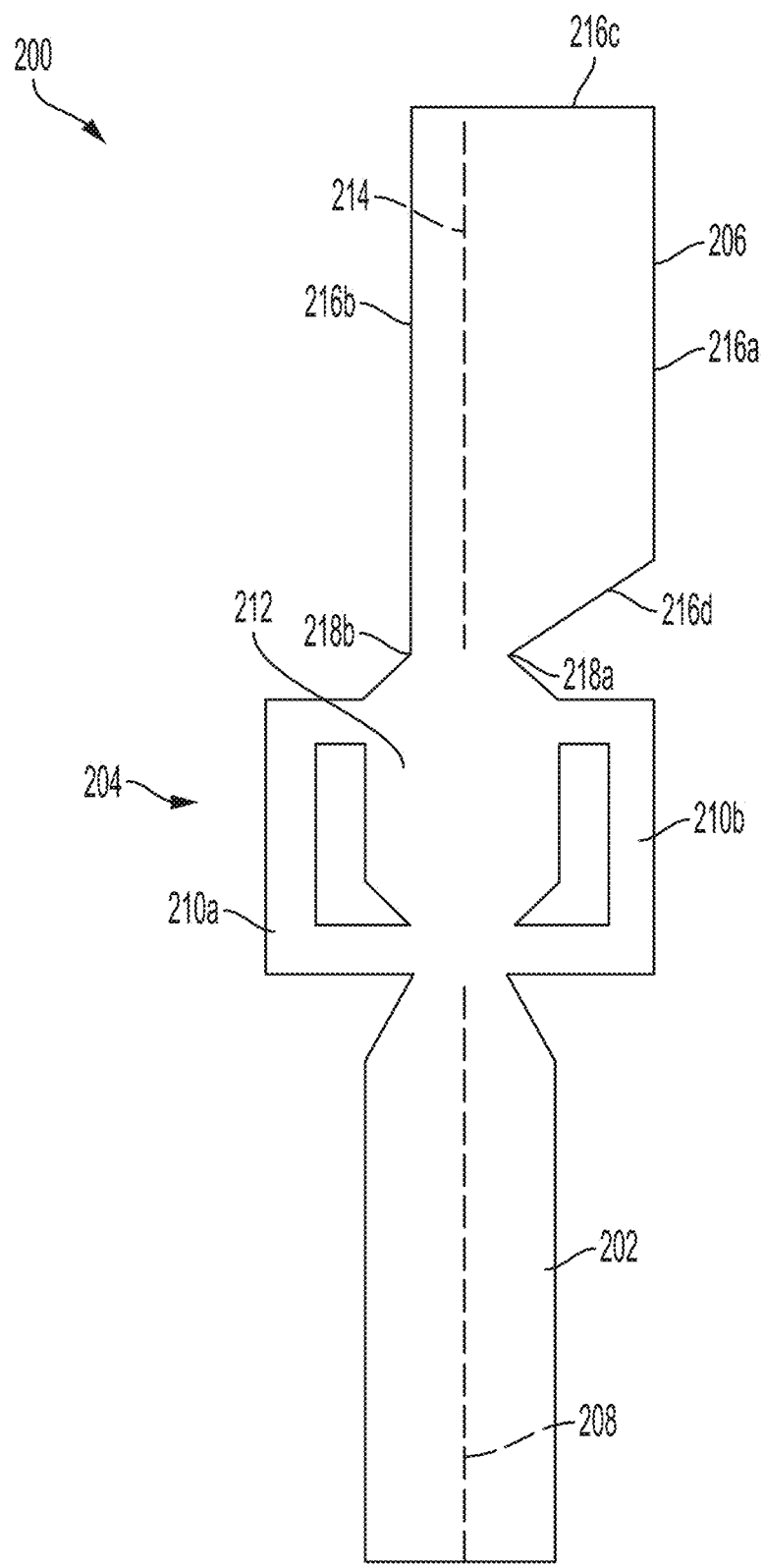
FIG. 2 is a block diagram of an acoustic device that can be used in a surface flow line according to one example of the present disclosure.

FIG. 2 is a diagram of an asymmetric fluidic oscillator 200 according to one example of the present disclosure. The asymmetric fluidic oscillator 200 can be included in the flow meters 110a-c illustrated in FIG. 1. For example, the acoustic devices 112a-c can be or include the asymmetric fluidic oscillator 200 as illustrated in FIG. 2. The asymmetric fluidic oscillator 200 can include an inlet channel 202, a feedback system 204, an outlet channel 206, and any other suitable components.

The inlet channel 202 may include a receiving path in the asymmetric fluidic oscillator 200. For example, the inlet channel 202 can receive fluid (e.g., from the casing 106 or other suitable components of the wellbore 100) that may originate upstream from the asymmetric fluidic oscillator 200, and the inlet channel 202 can direct the fluid further into the asymmetric fluidic oscillator 200 such as into the feedback system 204. As illustrated in FIG. 2, the inlet channel 202 is symmetric about axis 208, but the inlet channel 202 may be symmetric about other axes or asymmetric.

The feedback system 204 can be coupled to the inlet channel 202, the outlet channel 206, other suitable components, or a combination thereof. The feedback system 204 can include a first feedback loop 210a, a second feedback loop 210b, a mixing chamber 212, any other suitable components, or a combination thereof. Additionally, the feedback system may be otherwise suitably shaped or configured. For example, the feedback system 204 can include more or fewer feedback loops 210, a differently sized or shaped mixing chamber 212, differently shaped or sized feedback loops 210, etc. for oscillating the fluid.

The outlet channel 206 can be coupled to the feedback system 204. For example, the outlet channel 206 can be coupled to the feedback loops 210a-b, the mixing chamber 212, etc. The outlet channel 206 may define an exit path for fluid received from the feedback system 204. For example, fluid may be received from the feedback system 204 by the outlet channel 206, which may direct the fluid out of the asymmetric fluidic oscillator 200. The outlet channel 206 may be asymmetric. For example, the outlet channel 206 may not be symmetric along any suitable axes of the outlet channel 206. As illustrated, the outlet channel 206 is not symmetric about axis 214, which may be similar or identical to the axis 208 of the inlet channel 202. The asymmetric nature of the outlet channel 206 may cause disruptions or other variations in the flow of fluid passing through the outlet channel 206. For example, the asymmetry of the outlet channel 206 may interrupt the natural flow of the fluid, and the interruption may cause vibrations or other suitable acoustic signals that may be larger or that otherwise may include higher intensities than signals produced from other fluidic oscillators.

The outlet channel 206 can be an irregularly shaped quadrilateral or any other suitable irregular or asymmetric shapes (e.g., an irregular pentagon, a regular quadrilateral having jagged edges, etc.). The outlet channel 206 can include a right side 216a, a left side 216b, a top side 216c, and a bottom side 216d. The right side 216a may be connected to the bottom side 216d and to the top side 216c, the left side 216b may be connected to the top side 216c and to the feedback system 204, and the bottom side 216d may be connected to the feedback system 204. The right side 216a and the left side 216b may be substantially parallel to one another. In other examples, the right side 216a and the left side 216b may be non-parallel. Additionally, the top side 216c and the bottom side 216d may be non-parallel for forming the asymmetric feature of the outlet channel 206. In some examples, the asymmetric feature can be formed via the bottom side 216d coupling to the feedback system 204 in a first location 218a, while the left side 216b is coupled in a second location 218b to the feedback system 204. Accordingly, the right side 216a may be shorter than the left side 216b, and the bottom side 216d may include a defined and non-zero slope.

Figure 3:
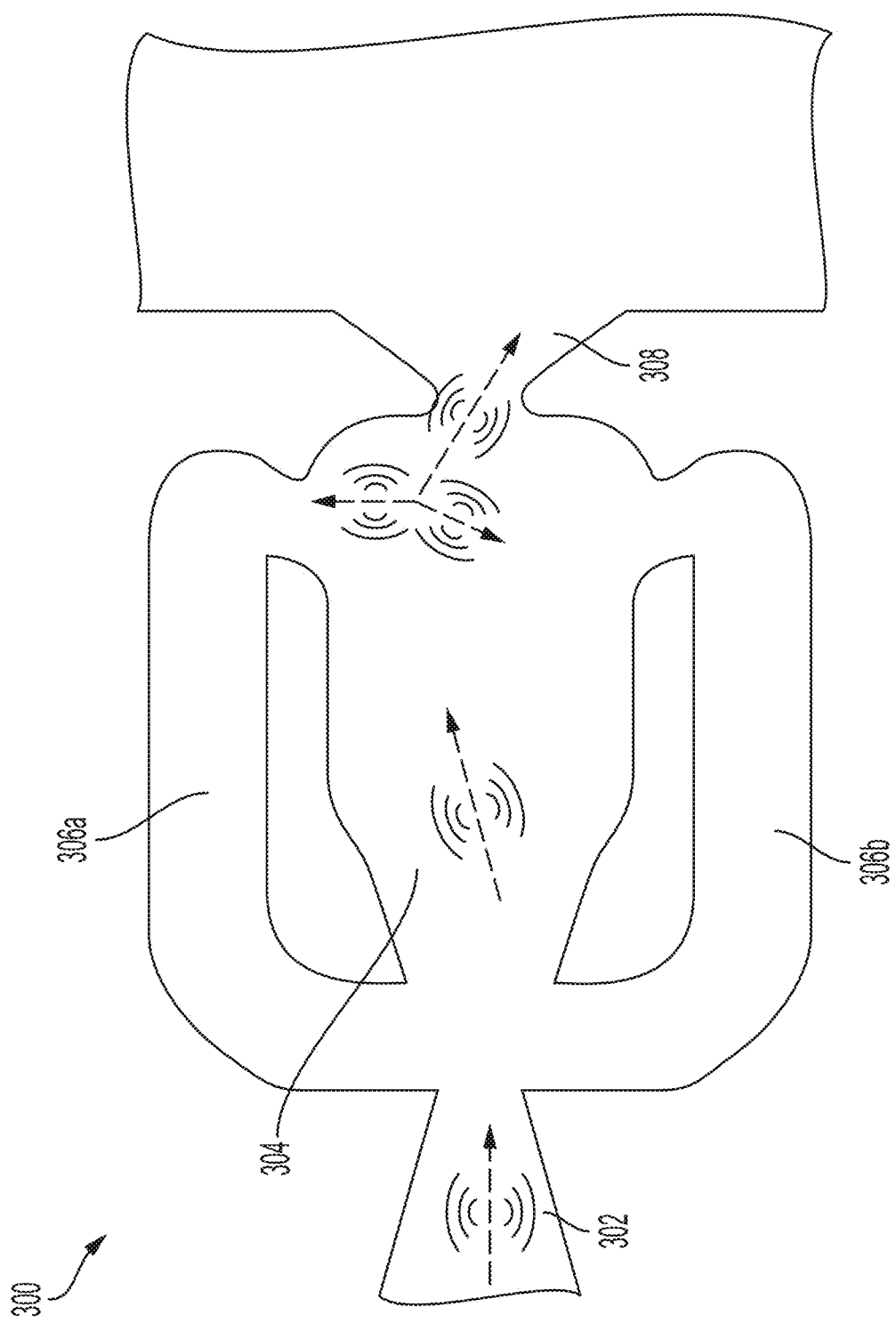
FIG. 3 is a diagram of fluid flow with respect to a fluidic oscillator according to one example of the present disclosure.

FIG. 3 is a diagram of fluid flow with respect to a fluidic oscillator 300 according to one example of the present disclosure. The fluidic oscillator 300 can include an inlet channel 302, a mixing chamber 304, feedback loops 306a-b, and an outlet channel 308. The inlet channel 302 may be coupled to the mixing chamber 304, which may be coupled to the feedback loops 306a-b and the outlet channel 308. The fluidic oscillator 300 can include other or different suitable components. Additionally, while illustrated as symmetric, the fluidic oscillator 300 may be asymmetric or otherwise include an asymmetric feature (e.g., similar to the fluidic oscillator 200).

Fluid may be directed into the fluidic oscillator 300 via the inlet channel 302. The fluid may travel into the mixing chamber 304, and the fluid may oscillate (e.g., in the mixing chamber 304, by traveling through one or more of the feedback loops 306a-b, by flowing through the outlet channel 308, etc.). The frequency of oscillation of the fluid may depend on various factors. For example, the frequency of oscillation of the fluid can be a linear function of the flow rate of the fluid. Additionally or alternatively, the frequency of oscillation of the fluid may depend on pressure drop (e.g., the square root of the pressure drop) in the fluidic oscillator 300. The frequency of oscillation may depend on other suitable factors relating to the fluidic oscillator 300. In some examples, the oscillation of the fluid in the fluidic oscillator 300 may cause acoustic signals to be generated. Acoustic signals generated from other fluidic oscillators (e.g., symmetric fluidic oscillators, etc.) may not include an intensity large enough to be detected with respect to the wellbore 100. Accordingly, the fluidic oscillator 300 may be asymmetric to generate acoustic signals with increased intensity compared to the other fluidic oscillators.

Figure 4:
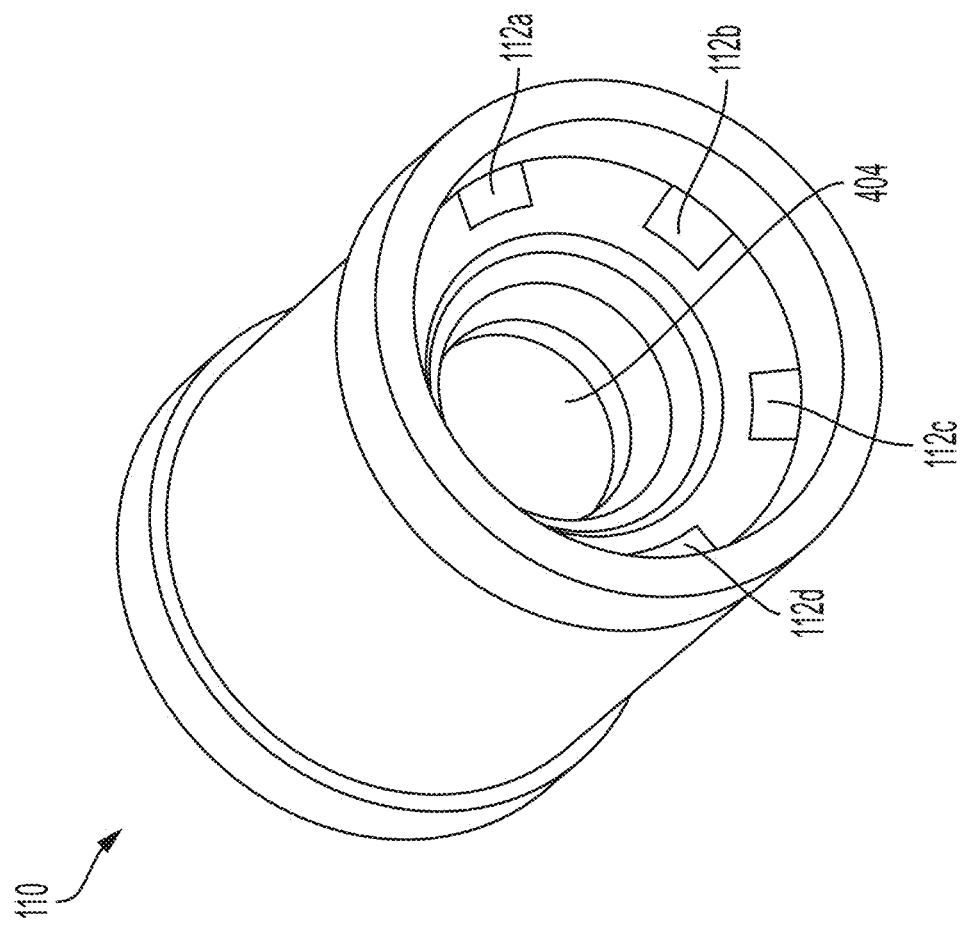
FIG. 4 is a perspective view of a flow meter device according to one example of the present disclosure.

FIG. 4 is a perspective view of a flow meter 110 according to one example of the present disclosure. The flow meter 110 can be positioned in the wellbore 100, at the surface 108 of the wellbore 100, or in other suitable locations. In some examples, the flow meter 110 can be positioned in the casing 106 or other suitable flow line of the wellbore 100. The flow meter 110 can be used to determine flow rate and other information relating to fluid flowing with respect to the wellbore 100. The flow meter 110 can include a set of acoustic devices 112a-d and a bore hole 404. While illustrated with four acoustic device 112a-d, the flow meter 110 can include other suitable numbers (e.g., less than four or more than four) of acoustic devices 112. The flow meter 110 can include any other suitable components.

The flow meter 110 can include a number of acoustic devices 112 that may correspond to a number of phases of fluid from the wellbore 100. For example, if the fluid includes four phases, then the flow meter 110 can include (e.g., as illustrated) four acoustic devices 112. In other examples, the number of acoustic devices 112 may not correspond to the number of phases of the fluid. For example, if the fluid includes four phases, the flow meter 110 can include less than four or more than four acoustic devices 112. As illustrated, the acoustic devices 112a-d are positioned near the circumference of the flow meter 110, but the acoustic devices 112a-d can be positioned in other suitable locations with respect to the flow meter 110. The acoustic devices 112a-d can be positioned to detect or otherwise sense data relating to one or more phases of the fluid. For example, the acoustic device 112a may be positioned to sense data about a gas phase of the fluid, the acoustic device 112b may be positioned to sense data about a combination oil/gas phase of the fluid, the acoustic device 112c may be positioned to sense data about a water phase of the fluid, etc. The flow meter 110 may be positioned in (or approximately in) the center of the bore hole 404. The size of the bore hole 404, the shape of the bore hole 404, or a combination thereof can be selected or adjusted based on expected fluid properties, the acoustic device 112 type or placement, desired measurements, other suitable parameters, or any combination thereof. In some examples, the bore hole 404 may be omitted.

Figure 5:
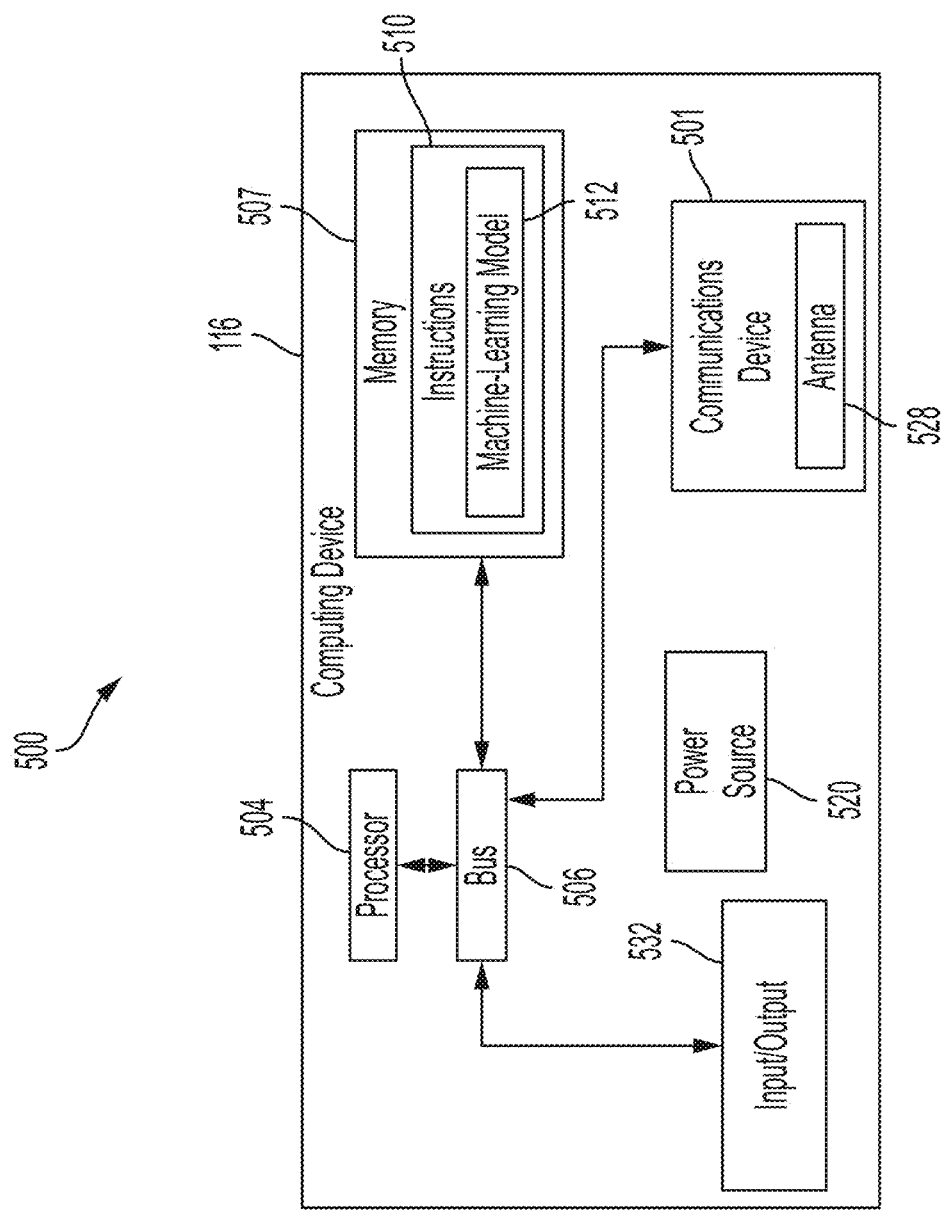
FIG. 5 is a block diagram of a computing system for determining multi-phase measurements of produced material from a wellbore according to one example of the present disclosure.

FIG. 5 is a block diagram of a computing system 500 for determining multi-phase measurements of produced material from a wellbore according to one example of the present disclosure. The components shown in FIG. 5, such as the processor 504, memory 507, power source 520, and communications device 501, may be integrated into a single structure, such as within a single housing of a computing device 116. Alternatively, the components shown in FIG. 5 can be distributed from one another and in electrical communication with each other.

The computing system 500 may include the computing device 116. The computing device 116 can include a processor 504, a memory 507 (e.g., non-volatile), and a bus 506. The processor 504 can execute one or more operations for interpreting acoustic signals and determining information (e.g., fluid type, flow rate, phase ratios, etc.) relating to multi-phase fluid flowing in (or from) the wellbore 100. The processor 504 can execute instructions stored in the memory 507 to perform the operations. The processor 504 can include one processing device or multiple processing devices or cores. Non-limiting examples of the processor 504 include a Field-Programmable Gate Array ("FPGA"), an application-specific integrated circuit ("ASIC"), a microprocessor, etc.

The processor 504 can be communicatively coupled to the memory 507 via the bus 506. The memory 507 may include any type of memory device that retains stored information when powered off. Non-limiting examples of the memory 507 may include EEPROM, flash memory, or any other type of non-volatile memory. In some examples, at least part of the memory 507 can include a medium from which the processor 504 can read instructions. A computer-readable medium can include electronic, optical, magnetic, or other storage devices capable of providing the processor 504 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 507 can include computer program instructions 510 for generating, training, and applying the machine-learning model 512. For example, the computer program instructions 510 can include the machine-learning model 512 that is executable by the processor 504 for causing the processor 504 to determine multi-phase measurements for fluid flowing with respect to the wellbore 100. The machine-learning model 512 can be trained using historical flow data (e.g., from a reference wellbore), synthetic data, or a combination thereof. For example, the computing device 116 can receive data indicating historical flow from a reference wellbore. Additionally, the computing device 116 can generate the synthetic data by generating (e.g., instead of measuring) varying types of data relating to multi-phase fluid flow. The computing device 116 can generate training data using the historical flow data and the synthetic data, and the computing device 116 can use the training data to train the machine-learning model 512 to interpret acoustic signals from or otherwise received with respect to the wellbore 100. For example, the trained machine-learning model 512 can be applied to the acoustic signals to determine multi-phase measurements (e.g., flow rate, ratio of phases, type of fluid, etc.) for the fluid.

The computing device 116 can include a power source 520. The power source 520 can be in electrical communication with the computing device 116 and the communications device 501. In some examples, the power source 520 can include a battery or an electrical cable (e.g., a wireline). The power source 520 can include an AC signal generator. The computing device 116 can operate the power source 520 to apply a transmission signal to the antenna 528 to generate electromagnetic waves that convey data relating to the multi-phase measurements, the acoustic devices 112a-c, etc. to other systems. For example, the computing device 116 can cause the power source 520 to apply a voltage with a frequency within a specific frequency range to the antenna 528. This can cause the antenna 528 to generate a wireless transmission. In other examples, the computing device 116, rather than the power source 520, can apply the transmission signal to the antenna 528 for generating the wireless transmission.

In some examples, part of the communications device 501 can be implemented in software. For example, the communications device 501 can include additional instructions stored in memory 507 for controlling functions of the communication device 501. The communications device 501 can receive signals from remote devices and transmit data to remote devices. For example, the communications device 501 can transmit wireless communications that are modulated by data via the antenna 528. In some examples, the communications device 501 can receive signals (e.g. associated with data to be transmitted) from the processor 504 and amplify, filter, modulate, frequency shift, or otherwise manipulate the signals. In some examples, the communications device 501 can transmit the manipulated signals to the antenna 528. The antenna 528 can receive the manipulated signals and responsively generate wireless communications that carry the data.

The computing device 116 can additionally include an input/output interface 532. The input/output interface 532 can connect to a keyboard, pointing device, display, and other computer input/output devices. An operator may provide input using the input/output interface 532. Data relating to fluid flow can be displayed to an operator of the wellbore 100 through a display that is connected to or is part of the input/output interface 532. The displayed values can be observed by the operator, or by a supervisor of the wellbore 100, who can make adjustments to wellbore operations based on the displayed values. Additionally or alternatively, the computing device 116 can automatically control or adjust the wellbore operations based on multi-phase measurements made via the acoustic devices 112a-c.

Figure 6:
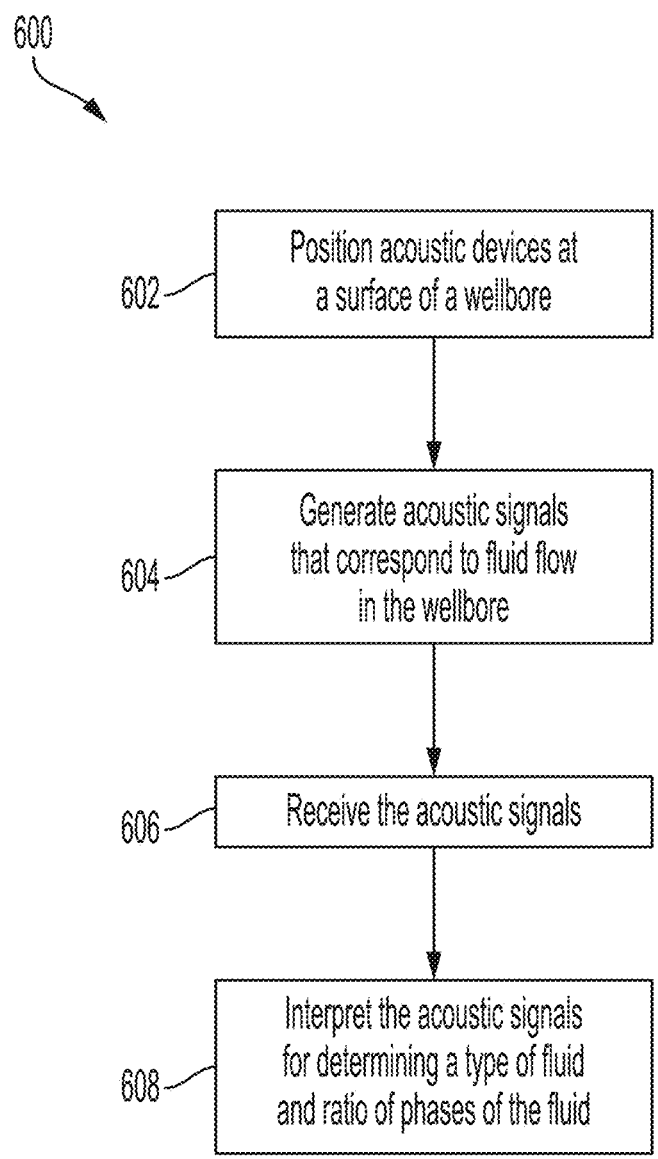
FIG. 6 is a flow chart of a process for determining multi-phase measurements of fluid from a wellbore according to one example of the present disclosure.

FIG. 6 is a flow chart of a process 600 for determining multi-phase measurements of fluid from a wellbore 100 according to one example of the present disclosure. At block 602, a set of acoustic devices 112 are positioned at a surface 108 of a wellbore 100. The set of acoustic devices 112 can be positioned in one or more flow meter devices 110, which can be positioned on (or within) a surface flow line 102 of the wellbore 100. The set of acoustic devices 112 can be positioned for making multi-phase measurements of a fluid flowing in or from the wellbore 100. For example, three flow meter devices 110a-c, each including a corresponding acoustic device 112a-c, can be positioned in the surface flow line 102 a minimum distance apart. The acoustic devices 112a-c can be positioned at the top, bottom, and circumferential middle, respectively, of the flow meter devices 110a-c, respectively. Accordingly, the acoustic device 112a may be positioned for measuring a gas phase, which may generate large signals and otherwise drown-out other phase measurements, of the fluid, the acoustic device 112b may be positioned for measuring the water or oil phase of the fluid, and the acoustic device 112c may be positioned for measuring a combination phase of the fluid. The acoustic devices 112a-c can be otherwise suitably arranged for making multi-phase measurements of the fluid. In some examples, the set of acoustic devices 112 may include one acoustic device 112. For example, the set of acoustic devices may include one acoustic device 112 for an injection operation, which may involve a single phase of fluid, relating to the wellbore 100.

At block 604, acoustic signals are generated such that the acoustic signals correspond to flow of fluid with respect to the wellbore 100. The fluid can be characterized by one or more flow rates that may correspond to phases of the fluid. The acoustic devices 112 can generate acoustic signals of varying frequencies based on the positions of the acoustic devices 112 or phases measured. For example, the acoustic device 112a may generate acoustic signals for the gas phase with a first frequency that is different than a second frequency of acoustic signals generated by the acoustic device 112b for the water or oil phase. The acoustic signals can be propagated outward from the acoustic devices 112 for sensing by the measurement device 118.

At block 606, the acoustic signals are received. The measurement device 118 can be positioned proximate to or otherwise suitably with respect to the acoustic devices 112. For example, the measurement device can be positioned to sense the acoustic signals generated by the acoustic devices 112. The measurement device 118 can sense the acoustic signals and transmit the acoustic signals to the computing device 116. In some examples, transmitting the acoustic signals to the computing device 116 can involve the measurement device 118 (e.g., as a fiber-optic cable, etc.) converting the acoustic signals to optical signals or the measurement device 118 (e.g., as a pressure transducer, etc.) converting the acoustic signals to electrical signals. The measurement device 118 can transmit the converted signals to the computing device 116.

At block 608, the acoustic signals are interpreted to determine multi-phase measurements of the fluid flowing with respect to the wellbore 100. The computing device 116 can interpret the acoustic signals or the converted signals. For example, the computing device 116 can determine various multi-phase measurements relating to the fluid flowing in the surface flow line 102. The multi-phase measurements can include a type of fluid, ratios of phases of the fluid, one or more flow rates (e.g., corresponding to the fluid as-a-whole or to phases thereof), etc. In some examples, the computing device 116 can apply a trained machine-learning model 512 to interpret the acoustic or converted signals to determine the multi-phase measurements.

Figure 7:
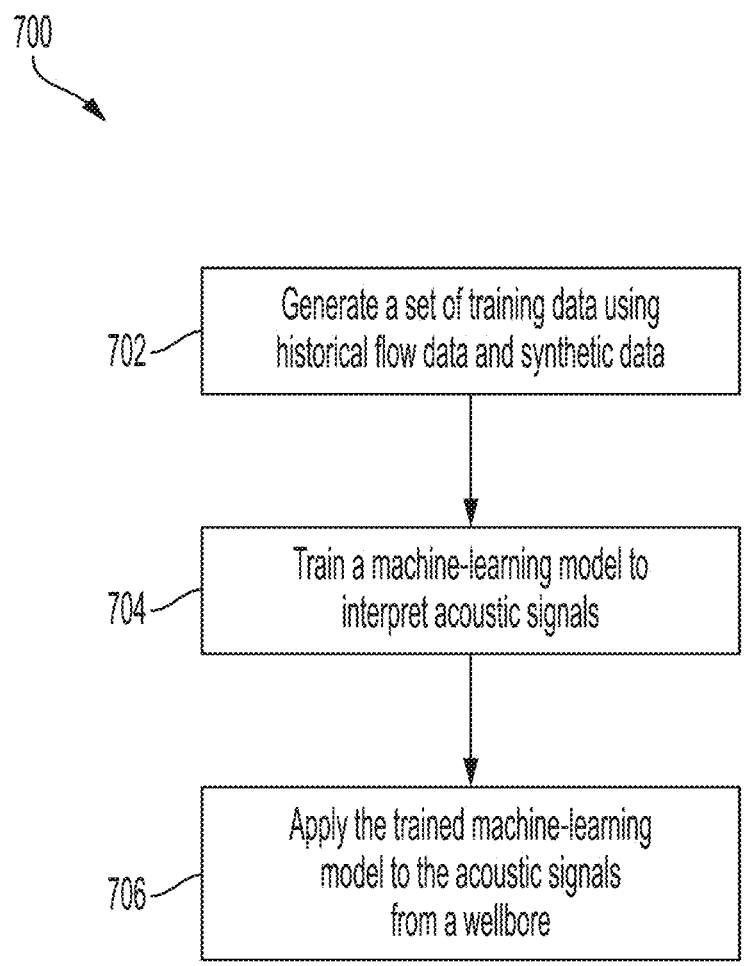
FIG. 7 is a flow chart of a process for training and applying a machine-learning model for interpreting acoustic signals from a wellbore according to one example of the present disclosure.

FIG. 7 is a flow chart of a process 700 for training and applying a machine-learning model 512 for interpreting acoustic signals from a wellbore 100 according to one example of the present disclosure. At block 702, the computing device 116 generates a set of training data. The set of training data can include synthetic data and historical flow data for reference or offset wellbores. The computing device 116 can receive (e.g., from other computing devices, networks etc.) the historical flow data, and the computing device 116 can generate the synthetic data. The synthetic data can be generated, for example relating to fluid flow in similar environments and wellbores or well systems, instead of making additional measurements. The computing device 116 can concatenate or otherwise aggregate the historical flow data and the synthetic data to generate the set of training data.

At block 704, the computing device 116 trains the machine-learning model 512 using the set of training data. The computing device 116 can use the training data to adjust or otherwise optimize the weights or predictions of the machine-learning model 512. For example, the training data can be input into the machine-learning model 512 to optimize predictions relating to multi-phase measurements of the fluid. The computing device 116 can optimize the weights of the machine-learning model 512, or perform other suitable training tasks with respect to the machine-learning model 512, to train the machine-learning model 512 to accurately interpret the acoustic signals.

At block 706, the computing device 116 applies the trained machine-learning model 512 to the acoustic signals. The computing device 116 can receive the acoustic signals. The computing device 116 can apply the trained machine-learning model 512 to the acoustic signals by, for example, inputting the acoustic signals, or converted signals representative of the acoustic signals, into the trained machine-learning model 512. The trained machine-learning model 512 can output predictions or interpretations, based on the received signals, relating to the fluid flowing in the surface flow line 102. For example, the trained machine-learning model 512 can output determinations relating to a type of fluid flowing in the surface flow line 102, ratio of phases of the fluid, flow rates of the fluid, etc. The trained machine-learning model 512 can generate other suitable interpretations relating to the acoustic signals.

Figure 8:
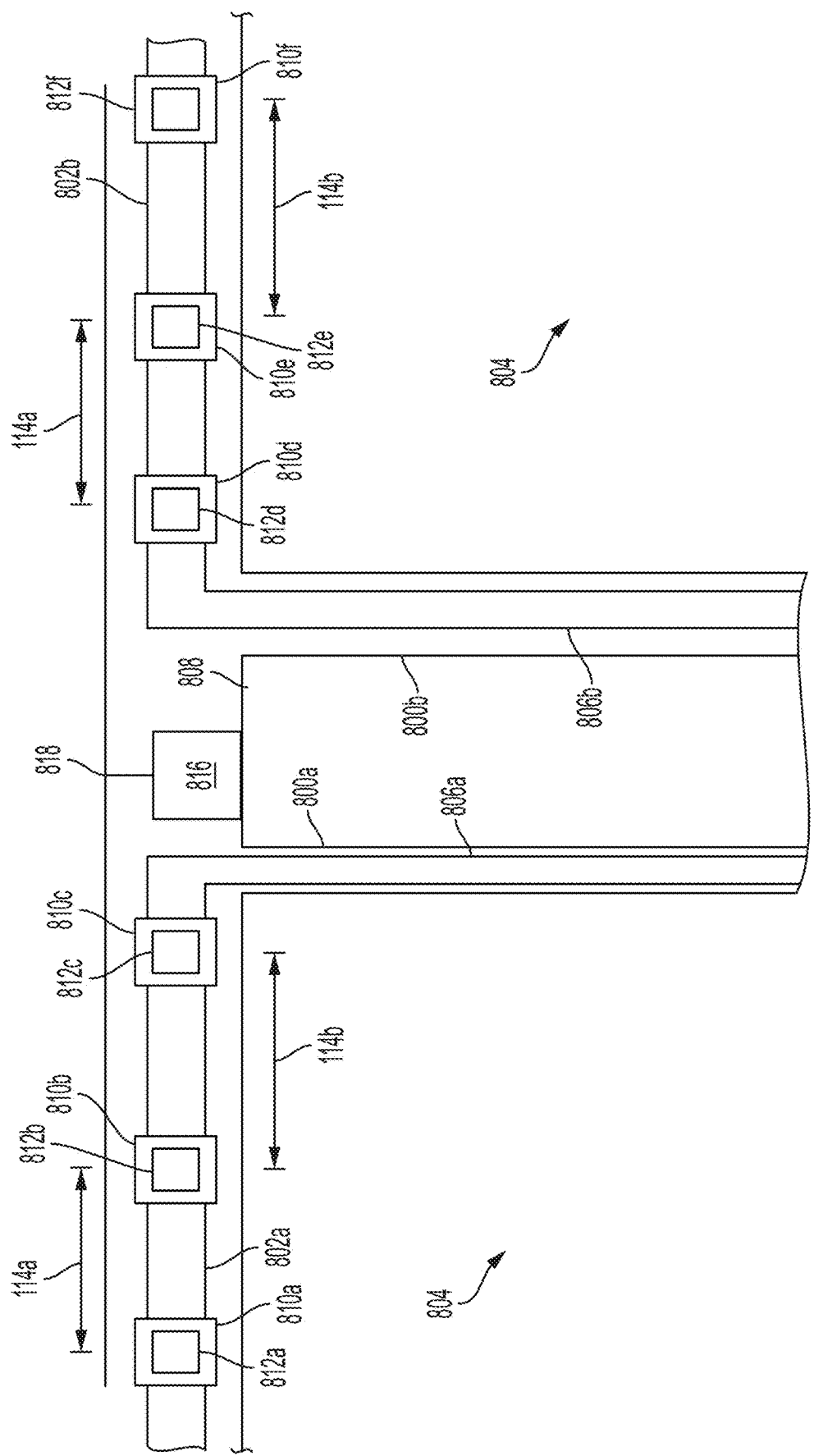
FIG. 8 is a diagram of a set of wellbores that each include a surface flow line according to one example of the present disclosure.

FIG. 8 is a diagram of a set of wellbores 800a-b that each include a surface flow line 802a-b according to one example of the present disclosure. The wellbores 800a-b may each be similar or identical to the wellbore 100. For example, the wellbores 800a-b may be formed in a subterranean formation 804 (or sub-oceanic formation) for producing fluid or other suitable material from the formation 804. The wellbores 800a-b may originate from or be included in a multi-well pad that includes a plurality of wellbores formed in the formation 804. As illustrated, the surface flow lines 802a-b are directed in opposing directions, but the surface flow lines 802a-b can be directed in any other suitable directions including a similar or identical direction.

The wellbore 800a may include surface flow line 802a, which may be coupled to casing 806a disposed in the wellbore 800a. The casing 806a may direct produced fluid into the surface flow line 802a. The surface flow line 802a may include a set of flow meter devices 810a-c, which each may include one or more acoustic devices 812a-c. As illustrated, the surface flow line 802a includes three flow meter devices 810a-c and three acoustic devices 812a-c. However, the surface flow line 802a can include any other suitable number of flow meter devices 810 and acoustic devices 812 for making multi-phase measurements relating to fluid from the wellbore 800a. For example, a number of acoustic devices 812 may correspond to a number of phases or expected phases of fluid from the wellbore 800a.

The wellbore 800b may include surface flow line 802b, which may be coupled to casing 806b disposed in the wellbore 800b. The casing 806b may direct produced fluid into the surface flow line 802b. The surface flow line 802b may include a set of flow meter devices 810d-f, which each may include one or more acoustic devices 812d-f. As illustrated, the surface flow line 802b includes three flow meter devices 810d-f and three acoustic devices 812d-f. However, the surface flow line 802b can include any other suitable number of flow meter devices 810 and acoustic devices 812 for making multi-phase measurements relating to fluid from the wellbore 800b. For example, a number of acoustic devices 812 may correspond to a number of phases or expected phases of fluid from the wellbore 800b.

A computing device 816 can be positioned at the surface 808 of the wellbores 800a-b. The computing device 816 can be communicatively coupled to a measurement device 818. As illustrated, the measurement device 818 is a fiber-optic cable, but the measurement device 818 can alternatively be or include a pressure transducer, a geophone, a hydrophone, a differential pressure sensor, etc. The measurement device 818 can sense acoustic signals generated by the acoustic devices 812a-f and can direct the acoustic signals (e.g., convert and transmit the signals) to the computing device 816. Accordingly, the computing device 816 can interpret signals from the wellbores 800a-b and can determine multi-phase measurements for fluid from the wellbores 800a-b.

FIG. 9 is a diagram of a wellbore 900 that includes a downhole flow meter device 902 and a measurement device 904 according to one example of the present disclosure. In some examples, the downhole flow meter device 902 (and the configuration illustrated in FIG. 9) can be used stand-alone or in combination with a surface flow line such as the surface flow line 102 of FIG. 1. The wellbore 900 can be formed in a subterranean formation 906, and the wellbore 100 can include a casing 908 or other suitable flow lines. The wellbore 900 can be used to produce fluid (e.g., multi-phase fluid) from the subterranean formation 906.

The downhole flow meter device 902 can be positioned in the wellbore 900. For example, the downhole flow meter device 902 can be affixed to, or otherwise positioned in, the casing 908 or any other suitable location with respect to the wellbore 900 for making multi-phase measurements in the wellbore 900. Fluid can travel through the downhole flow meter device 902, which can generate acoustic signals.

In some examples, the downhole flow meter device 902 can include one or more acoustic devices 112. For example, the downhole flow meter device 902 can include one, two, three, four, or more acoustic devices 112 for measuring various numbers of phases of the fluid. For example, if the fluid includes or is expected to include three phases corresponding to oil, gas, and water, then the downhole flow meter device 902 can include three acoustic devices 112. In some examples, the number of acoustic devices 112 may not correspond to the number of phases. Alternatively, three separate downhole flow meter devices 902 each including one acoustic device 112 can be used. In some examples, the three acoustic devices 112 may be positioned in different locations around a circumference of the downhole flow meter device 902.

The measurement device 904 can be used to detect the acoustic signals emitted from or generated by the downhole flow meter device 902. The measurement device 904 can be a fiber-optic cable or other types of measurement devices 904. The measurement device 904 can be communicatively coupled to a detection system 912. The detection system 912 can be positioned at a surface 914 of the wellbore 900 or in other suitable locations with respect to the wellbore 900. The measurement device 904 can be connected to the detection system 912 via a wired connection, a wireless connection, or both. In some examples, the detection system 912 can include a DAS system, a computing system configured to receive, record, or analyze the acoustic signals, other suitable detection systems, or any combination thereof.

Fluid produced via the wellbore 900 can travel or can otherwise be forced or directed through the downhole flow meter device 902 that includes the acoustic device 112. The fluid can oscillate in the acoustic device 112, which can propagate acoustic signals. The acoustic signals can be detected using the measurement device 904, which can transmit a subsequent signal to the detection system 912. The signals can be used by the detection system 912 to determine multi-phase measurements relating to the fluid.

In some examples, the surface flow line 102 of FIG. 1 can be used in combination with the downhole flow meter device 902. For example, the detection system 912 can be the computing device 116, and the casing 908 can be coupled to the surface flow line 102. The measurement device 904 can include the measurement device 118 and can sense acoustic signals from the acoustic devices 112 of the surface flow line 102 and the downhole flow meter device 902. Accordingly, the computing device 116 can use the downhole acoustic signals (e.g., determined via the downhole flow meter device 902) and the surface acoustic signals (e.g., determined via the surface flow line 102) to determine multi-phase measurements for the fluid.

In some aspects, systems, surface flow lines, and methods for acoustic devices for determining multi-phase fluid measurements with respect to a wellbore are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: one or more acoustic devices positionable at a surface of a wellbore to generate acoustic signals proportional to flow of fluid with respect to the wellbore; a measurement device positionable with respect to the one or more acoustic devices to sense the acoustic signals; and a computing device communicatively couplable to the measurement device to interpret the acoustic signals for determining a type of the fluid and a ratio of one or more phases of the fluid.

Example 2 is the system of example 1, wherein the one or more acoustic devices includes an asymmetric fluidic oscillator, a symmetric fluidic oscillator, or a hole-tone whistle, wherein the measurement device includes a fiber-optic cable, a fiber-optic sensor, a wired electrical sensor, or a wireless electrical sensor, and wherein the acoustic signals are detectable via the measurement device via electrical interrogation or optical interrogation.

Example 3 is the system of example 1, wherein the one or more phases of the fluid include a single phase of the fluid, and wherein the computing device is communicatively coupled to the measurement device to determine an amount and flow rate of the single phase of the fluid.

Example 4 is the system of example 1, wherein the phases of the fluid include oil, water, and gas, and wherein the computing device is communicatively coupled to the measurement device to determine an amount and flow rate of oil, an amount and flow rate of water, and an amount and flow rate of gas at the surface of the wellbore.

Example 5 is the system of example 1, wherein the computing device comprises: a processor; and a non-transitory computer-readable medium comprising instructions that are executable by the processor for causing the processor to perform operations comprising: receiving the acoustic signals from the measurement device; determining, based on the acoustic signals, the one or more phases of the fluid; and determining, based on the one or more phases of the fluid and the acoustic signals, one or more flow rates of the fluid and a ratio of the one or more phases of the fluid.

Example 6 is the system of any of examples 1 and 5, wherein the operations further comprise: generating a set of training data using historical flow data and synthetic data; training, using the set of training data, a machine-learning model to determine the one or more flow rates of the fluid and the ratio of the one or more phases of the fluid; and applying the trained machine-learning model to the acoustic signals to determine the one or more flow rates of the fluid and the ratio of the one or more phases of the fluid.

Example 7 is the system of example 1, further comprising a second plurality of acoustic devices positionable at a surface of a second wellbore to generate a second set of acoustic signals proportional to flow of fluid with respect to the second wellbore, wherein the measurement device is positionable to sense the second set of acoustic signals, and wherein the computing device is communicatively couplable to the measurement device to interpret the second set of acoustic signals for determining a type of the fluid and a ratio of one or more phases of the fluid with respect to the second wellbore.

Example 8 is the system of example 1, further comprising a plurality of flow meter devices, wherein each flow meter device of the plurality of flow meter devices includes at least one acoustic device of the one or more acoustic devices, and wherein each acoustic device of the one or more acoustic devices is positioned in a respective flow meter device of the plurality of flow meter devices to measure a particular phase of the fluid.

Example 9 is a surface flow line comprising: one or more flow meter devices positioned at a surface of a wellbore; and one or more acoustic devices corresponding to the one or more flow meter devices and positioned to generate acoustic signals that correspond to flow of fluid with respect to the surface flow line, the acoustic signals detectable by a measurement device positionable at the surface of the wellbore and interpretable by a computing device communicatively couplable to the measurement device to determine a type of the fluid and a ratio of one or more phases of the fluid.

Example 10 is the surface flow line of example 9, wherein the one or more acoustic devices includes an asymmetric fluidic oscillator, a symmetric fluidic oscillator, or a hole-tone whistle.

Example 11 is the surface flow line of example 9, wherein the phases of the fluid include oil, water, and gas, and wherein the computing device is communicatively coupled to the measurement device to determine an amount and flow rate of oil, an amount and flow rate of water, and an amount and flow rate of gas at the surface of the wellbore.

Example 12 is the surface flow line of example 9, further comprising the computing device, wherein the computing device comprises: a processor; and a non-transitory computer-readable medium comprising instructions that are executable by the processor for causing the processor to perform operations comprising: receiving the acoustic signals from the measurement device; determining, based on the acoustic signals, the one or more phases of the fluid; and determining, based on the one or more phases of the fluid and the acoustic signals, one or more flow rates of the fluid and a ratio of the one or more phases of the fluid.

Example 13 is the surface flow line of any of examples 9 and 12, wherein the operations further comprise: generating a set of training data using historical flow data and synthetic data; training, using the set of training data, a machine-learning model to determine the one or more flow rates of the fluid and the ratio of the one or more phases of the fluid; and applying the trained machine-learning model to the acoustic signals to determine the one or more flow rates of the fluid and the ratio of the one or more phases of the fluid.

Example 14 is the surface flow line of example 9, wherein each flow meter device of the one or more flow meter devices includes at least one acoustic device of the one or more acoustic devices, and wherein each acoustic device of the one or more acoustic devices is positioned in a respective flow meter device of the one or more flow meter devices to measure a particular phase of the fluid.

Example 15 is a method comprising: positioning one or more acoustic devices at a surface of a wellbore; generating, using the one or more acoustic devices, acoustic signals corresponding to flow of fluid with respect to the wellbore; receiving, using a computing device and via a measurement device coupled to the computing device, the acoustic signals; and determining, using the computing device and by interpreting the acoustic signals, a type of the fluid and a ratio of one or more phases of the fluid.

Example 16 is the method of example 15, wherein generating the acoustic signals includes flowing the fluid through an asymmetric fluidic oscillator, a symmetric fluidic oscillator, or a hole-tone whistle to generate the acoustic signals.

Example 17 is the method of example 15, wherein receiving the acoustic signals includes: sensing, by a fiber-optic cable, a fiber-optic sensor, a wired electrical sensor, or a wireless electrical sensor, the acoustic signals; and transmitting, by the fiber-optic cable, the fiber-optic sensor, the wired electrical sensor, or the wireless electrical sensor, signals derived from the acoustic signals to the computing device.

Example 18 is the method of example 15, further comprising: determining, by the computing device and based on the acoustic signals, the one or more phases of the fluid; and determining, by the computing device and based on the one or more phases of the fluid and the acoustic signals, one or more flow rates of the fluid and a ratio of the one or more phases of the fluid.

Example 19 is the method of any of examples 15 and 18, further comprising: generating, by the computing device, a set of training data using historical flow data and synthetic data; training, by the computing device and using the set of training data, a machine-learning model to determine the one or more flow rates of the fluid and the ratio of the one or more phases of the fluid; and applying, by the computing device, the trained machine-learning model to the acoustic signals to determine the one or more flow rates of the fluid and the ratio of the one or more phases of the fluid.

Example 20 is the method of example 15, further comprising: positioning one or more second acoustic devices at a surface of a second wellbore; generating, using the one or more second acoustic devices, a second set of acoustic signals corresponding to flow of fluid with respect to the second wellbore; receiving, using the computing device and via the measurement device coupled to the computing device, the second set of acoustic signals; and determining, using the computing device and by interpreting the second set of acoustic signals, a type of the fluid and a ratio of one or more phases of the fluid with respect to the second wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    one or more acoustic devices positionable at a surface of a wellbore to generate acoustic signals proportional to flow of fluid with respect to the wellbore;
    a measurement device positionable with respect to the one or more acoustic devices to sense the acoustic signals;
    a computing device communicatively couplable to the measurement device to interpret the acoustic signals for determining a type of the fluid and a ratio of one or more phases of the fluid; and
    a second plurality of acoustic devices positionable at a surface of a second wellbore to generate a second set of acoustic signals proportional to flow of fluid with respect to the second wellbore, wherein the measurement device is positionable to sense the second set of acoustic signals, and wherein the computing device is communicatively couplable to the measurement device to interpret the second set of acoustic signals for determining a type of the fluid and a ratio of one or more phases of the fluid with respect to the second wellbore.

2. The system of claim 1, wherein the one or more acoustic devices includes an asymmetric fluidic oscillator, a symmetric fluidic oscillator, or a hole-tone whistle, wherein the measurement device includes a fiber-optic cable, a fiber-optic sensor, a wired electrical sensor, or a wireless electrical sensor, and wherein the acoustic signals are detectable via the measurement device via electrical interrogation or optical interrogation.

3. The system of claim 1, wherein the one or more phases of the fluid include a single phase of the fluid, and wherein the computing device is communicatively coupled to the measurement device to determine an amount and flow rate of the single phase of the fluid.

4. The system of claim 1, wherein the phases of the fluid include oil, water, and gas, and wherein the computing device is communicatively coupled to the measurement device to determine an amount and flow rate of oil, an amount and flow rate of water, and an amount and flow rate of gas at the surface of the wellbore.

5. The system of claim 1, wherein the computing device comprises:
    a processor; and
    a non-transitory computer-readable medium comprising instructions that are executable by the processor for causing the processor to perform operations comprising:
        receiving the acoustic signals from the measurement device;

determining, based on the acoustic signals, the one or more phases of the fluid; and determining, based on the one or more phases of the fluid and the acoustic signals, one or more flow rates of the fluid and a ratio of the one or more phases of the fluid.

6. The system of claim 5, wherein the operations further comprise:

generating a set of training data using historical flow data and synthetic data;

training, using the set of training data, a machine-learning model to determine the one or more flow rates of the fluid and the ratio of the one or more phases of the fluid; and applying the trained machine-learning model to the acoustic signals to determine the one or more flow rates of the fluid and the ratio of the one or more phases of the fluid.

7. The system of claim 1, further comprising a plurality of flow meter devices, wherein each flow meter device of the plurality of flow meter devices includes at least one acoustic device of the one or more acoustic devices, and wherein each acoustic device of the one or more acoustic devices is positioned in a respective flow meter device of the plurality of flow meter devices to measure a particular phase of the fluid.

8. A surface flow line comprising:

one or more flow meter devices positioned at a surface of a wellbore;

one or more acoustic devices corresponding to the one or more flow meter devices and positioned to generate acoustic signals that correspond to flow of fluid with respect to the surface flow line, the acoustic signals detectable by a measurement device positionable at the surface of the wellbore and interpretable by a computing device communicatively couplable to the measurement device to determine a type of the fluid and a ratio of one or more phases of the fluid; and a second plurality of acoustic devices positionable at a surface of a second wellbore to generate a second set of acoustic signals proportional to flow of fluid with respect to the second wellbore, wherein the measurement device is positionable to sense the second set of acoustic signals, and wherein the computing device is communicatively couplable to the measurement device to interpret the second set of acoustic signals for determining a type of the fluid and a ratio of one or more phases of the fluid with respect to the second wellbore.

9. The surface flow line of claim 8, wherein the one or more acoustic devices includes an asymmetric fluidic oscillator, a symmetric fluidic oscillator, or a hole-tone whistle.

10. The surface flow line of claim 8, wherein the phases of the fluid include oil, water, and gas, and wherein the computing device is communicatively coupled to the measurement device to determine an amount and flow rate of oil, an amount and flow rate of water, and an amount and flow rate of gas at the surface of the wellbore.

11. The surface flow line of claim 8, further comprising the computing device, wherein the computing device comprises:

a processor; and a non-transitory computer-readable medium comprising instructions that are executable by the processor for causing the processor to perform operations comprising:

receiving the acoustic signals from the measurement device;

determining, based on the acoustic signals, the one or more phases of the fluid; and determining, based on the one or more phases of the fluid and the acoustic signals, one or more flow rates of the fluid and a ratio of the one or more phases of the fluid.

12. The surface flow line of claim 11, wherein the operations further comprise:

generating a set of training data using historical flow data and synthetic data;

training, using the set of training data, a machine-learning model to determine the one or more flow rates of the fluid and the ratio of the one or more phases of the fluid; and applying the trained machine-learning model to the acoustic signals to determine the one or more flow rates of the fluid and the ratio of the one or more phases of the fluid.

13. The surface flow line of claim 8, wherein each flow meter device of the one or more flow meter devices includes at least one acoustic device of the one or more acoustic devices, and wherein each acoustic device of the one or more acoustic devices is positioned in a respective flow meter device of the one or more flow meter devices to measure a particular phase of the fluid.

14. A method comprising:

positioning one or more acoustic devices at a surface of a wellbore;

generating, using the one or more acoustic devices, acoustic signals corresponding to flow of fluid with respect to the wellbore;

receiving, using a computing device and via a measurement device coupled to the computing device, the acoustic signals;

determining, using the computing device and by interpreting the acoustic signals, a type of the fluid and a ratio of one or more phases of the fluid;

positioning one or more second acoustic devices at a surface of a second wellbore;

generating, using the one or more second acoustic devices, a second set of acoustic signals corresponding to flow of fluid with respect to the second wellbore;

receiving, using the computing device and via the measurement device coupled to the computing device, the second set of acoustic signals; and determining, using the computing device and by interpreting the second set of acoustic signals, a type of the fluid and a ratio of one or more phases of the fluid with respect to the second wellbore.

15. The method of claim 14, wherein generating the acoustic signals includes flowing the fluid through an asymmetric fluidic oscillator, a symmetric fluidic oscillator, or a hole-tone whistle to generate the acoustic signals.

16. The method of claim 14, wherein receiving the acoustic signals includes:

sensing, by a fiber-optic cable, a fiber-optic sensor, a wired electrical sensor, or a wireless electrical sensor, the acoustic signals; and transmitting, by the fiber-optic cable, the fiber-optic sensor, the wired electrical sensor, or the wireless electrical sensor, signals derived from the acoustic signals to the computing device.

17. The method of claim 14, further comprising:

determining, by the computing device and based on the acoustic signals, the one or more phases of the fluid; and determining, by the computing device and based on the one or more phases of the fluid and the acoustic signals, one or more flow rates of the fluid and a ratio of the one or more phases of the fluid.

18. The method of claim 17, further comprising:

generating, by the computing device, a set of training data using historical flow data and synthetic data;

training, by the computing device and using the set of training data, a machine-learning model to determine the one or more flow rates of the fluid and the ratio of the one or more phases of the fluid; and applying, by the computing device, the trained machine-learning model to the acoustic signals to determine the one or more flow rates of the fluid and the ratio of the one or more phases of the fluid.

* * * * *